(12) United States Patent
Woollen

(10) Patent No.: US 9,742,075 B2
(45) Date of Patent: Aug. 22, 2017

(54) SYSTEM INCLUDING A HYBRID ACTIVE ARRAY

(71) Applicant: The United States of America as represented by the Secretary of the Navy, Washington, DC (US)

(72) Inventor: David P. Woollen, Ellettsville, IN (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 209 days.

(21) Appl. No.: 14/827,188

(22) Filed: Aug. 14, 2015

(65) Prior Publication Data

US 2017/0040710 A1    Feb. 9, 2017

Related U.S. Application Data

(60) Provisional application No. 62/202,864, filed on Aug. 9, 2015.

(51) Int. Cl.
*H01Q 21/00* (2006.01)
*G01S 7/03* (2006.01)
(Continued)

(52) U.S. Cl.
CPC ......... *H01Q 21/0025* (2013.01); *G01S 7/032* (2013.01); *H01Q 1/34* (2013.01);
(Continued)

(58) Field of Classification Search
CPC ... G01S 7/02; G01S 7/03; G01S 7/032; G01S 13/02; G01S 2013/0236; G01S 2013/0245;
(Continued)

(56) References Cited

U.S. PATENT DOCUMENTS 4,124,852 A * 11/1978 Steudel ............... H01Q 3/26
                                                            333/136
4,682,176 A *  7/1987 Jones ..................... G01S 7/03
                                                            333/17.3
(Continued)

FOREIGN PATENT DOCUMENTS

WO    WO01/77706 A1 * 10/2001 ............... G01S 7/03

*Primary Examiner* — Bernarr Gregory
(74) *Attorney, Agent, or Firm* — Christopher A. Monsey

(57) ABSTRACT

A hybrid active array approach can combine aspects of a passive and active array architecture with transmitter, high power, and cooling components positioned in one location, e.g., below a ship deck, apart from a radiating location. Waveguides or signal transmission lines can convey a transmit signal from the transmitter to the radiating location, e.g., to a beamforming network (BFN), hybrid transmit/receive modules (HTRM), and a plurality of antenna elements. The exemplary BFN can set an amplitude distribution of an antenna aperture associated with the BFN, HTRMs, and plurality of antenna elements to control both transmit and receive sidelobes where low or reduced sidelobes on transmit reduces radiation outside of the main beam further reducing signal returns in one or more sidelobes sections of the antenna elements. In a receive mode, a reverse can occur and additional beamformers can be utilized for beamforming the receive beams.

11 Claims, 2 Drawing Sheets

(51) Int. Cl.
  *H01Q 3/34* (2006.01)
  *H01Q 3/24* (2006.01)
  *H01Q 1/34* (2006.01)
  *H01Q 3/00* (2006.01)
  *G01S 13/02* (2006.01)

(52) U.S. Cl.
  CPC ............... H01Q 3/24 (2013.01); H01Q 3/34 (2013.01); *G01S 2013/0254* (2013.01)

(58) Field of Classification Search
  CPC .. G01S 2013/0254; G01S 7/024; G01S 7/034; G01S 7/36; G01S 13/88; G01S 13/89; G01S 13/90; H01Q 1/27; H01Q 1/34; H01Q 21/00; H01Q 3/24; H01Q 3/26; H01Q 3/30; H01Q 3/34; H01Q 1/12; H01Q 1/18; H01Q 21/06; H01Q 21/20; H01Q 21/205; H01Q 3/22; H01Q 3/267; H01Q 3/2676; H01Q 3/28; H01Q 3/36; H01Q 21/0006; H01Q 21/0025; H03F 3/60; H03F 3/602; H03M 1/12; H03M 1/34; H03M 1/36; H03M 1/361; H03M 1/366; H04B 1/38; H04B 1/40; H04B 1/44; H04B 1/48
  See application file for complete search history.

(56) References Cited

U.S. PATENT DOCUMENTS

| | | | | |
|---|---|---|---|---|
| 4,814,773 A * | 3/1989 | Wechsberg | ............... | G01S 7/03 342/368 |
| 4,885,589 A * | 12/1989 | Edward | ............... | H01Q 3/2676 342/175 |
| 5,166,690 A * | 11/1992 | Carlson | ............... | H01Q 3/28 342/157 |
| 5,172,120 A * | 12/1992 | Slawsby | ............... | H01Q 1/18 342/132 |
| 5,173,703 A * | 12/1992 | Mangiapane | ............... | G01S 13/90 342/149 |
| 5,185,608 A * | 2/1993 | Pozgay | ............... | G01S 7/024 342/17 |
| 5,223,842 A * | 6/1993 | Okurowski | ............... | G01S 7/36 342/173 |
| 5,225,838 A * | 7/1993 | Kanter | ............... | G01S 7/36 342/61 |
| 5,225,839 A * | 7/1993 | Okurowski | ............... | G01S 7/36 342/174 |
| 5,253,188 A * | 10/1993 | Lee | ............... | H01Q 3/267 343/808 |
| 5,339,083 A * | 8/1994 | Inami | ............... | G01S 7/032 342/157 |
| 5,339,086 A * | 8/1994 | DeLuca | ............... | H01Q 3/22 342/371 |
| 5,353,033 A * | 10/1994 | Newberg | ............... | H01Q 3/2676 342/154 |
| 5,412,414 A * | 5/1995 | Ast | ............... | H01Q 3/22 342/174 |
| 5,493,305 A * | 2/1996 | Wooldridge | ............... | H01Q 21/0087 342/368 |
| 5,592,178 A * | 1/1997 | Chang | ............... | H01Q 3/22 342/154 |
| 5,909,191 A * | 6/1999 | Hirshfield | ............... | H01Q 3/267 342/174 |
| 5,995,062 A * | 11/1999 | Denney | ............... | H01Q 21/205 343/700 MS |
| 6,441,783 B1 * | 8/2002 | Dean | ............... | G01S 7/032 342/372 |
| 6,545,563 B1 * | 4/2003 | Smith | ............... | H03F 3/602 333/103 |
| 6,768,442 B2 * | 7/2004 | Meyers | ............... | H03M 1/366 327/65 |
| 6,784,837 B2 * | 8/2004 | Revankar | ............... | G01S 7/032 342/157 |
| 7,079,815 B2 * | 7/2006 | Pozgay | ............... | H04B 1/48 455/191.3 |
| 7,170,442 B2 * | 1/2007 | Lovberg | ............... | H01Q 3/22 250/332 |
| 7,260,418 B2 * | 8/2007 | Natarajan | ............... | H01Q 3/22 375/299 |
| 7,876,263 B2 * | 1/2011 | Quan | ............... | H01Q 21/06 342/154 |
| 7,889,121 B2 * | 2/2011 | Kanto | ............... | G01S 7/034 342/173 |
| 7,965,235 B2 * | 6/2011 | Quan | ............... | H01Q 3/26 342/372 |
| 8,259,686 B2 * | 9/2012 | Kanto | ............... | H01Q 3/36 370/334 |
| 8,754,810 B2 * | 6/2014 | Guo | ............... | H01Q 3/36 342/368 |

* cited by examiner

SYSTEM INCLUDING A HYBRID ACTIVE ARRAY

CROSS-REFERENCE TO RELATED APPLICATION

The present application claims priority to U.S. Provisional Patent Application Ser. No. 62/202,864, filed Aug. 9, 2015, the disclosure of which is expressly incorporated herein by reference.

STATEMENT REGARDING FEDERALLY SPONSORED RESEARCH OR DEVELOPMENT

The invention described herein includes contributions by one or more employees of the Department of the Navy made in performance of official duties and may be manufactured, used and licensed by or for the United States Government for any governmental purpose without payment of any royalties thereon. This invention (Navy Case 200,273) is assigned to the United States Government and is available for licensing for commercial purposes. Licensing and technical inquiries may be directed to the Technology Transfer Office, Naval Surface Warfare Center Crane, email: Cran_CTO@navy.mil.

BACKGROUND AND SUMMARY OF THE INVENTION

The present invention relates to a hybrid active array antenna system that includes elements of an electromagnetic spectrum transmitter system and a separate active receive array system. In particular, some embodiments include a system with high power transmission signal, power, and cooling elements at a different location (e.g., an equipment room) separated from an antenna with receive active array elements positioned at a radiating location, e.g., on a mast or tower.

Active arrays with transmit and receive elements require costly high power and cooling infrastructure and provisioning at an antenna location. Existing active array designs with active transmit systems at radiating locations are costly, require higher maintenance, experience increased failure rates due to, among other things, heat generated by transmit amplifiers, and are undesirable particularly in remote locations where maintenance is not easily performed including at mast locations which increase hazards to maintenance personnel.

Generally, embodiments of this disclosure can provide an improved system that reduces need for high voltage and current, cooling, etc. at a radiating location while still improving noise reduction. Embodiments include creating a receive active array system having a low noise amplifier close to each receiving antenna element while having high power transmitter signal generating elements, e.g., comprising an oscillator, high power amplifier, etc. in a separate equipment room which generates an output signal that is passed through a waveguide or transmission line(s) up to an antenna which includes a beamforming network (BFN) that is coupled with antenna radiating elements. Cooling and high power supply system provisioning and routing is simplified as such systems are not required to be routed up an antenna mounting platform or tower. One exemplary hybrid active array can include a transmitter component disposed at a location before the BFN that sets an amplitude distribution of the antenna aperture to control both the transmit and the receive sidelobes. Reducing antenna sidelobes during transmit operations reduces radiation outside of a main beam, further reducing signal returns in the sidelobes, providing a capability not achieved in existing active arrays. Embodiments of the invention reduce complexity and design costs of an array including the antenna design itself Additional features and advantages of the present invention will become apparent to those skilled in the art upon consideration of the following detailed description of the illustrative embodiment exemplifying the best mode of carrying out the invention as presently perceived.

BRIEF DESCRIPTION OF THE DRAWINGS

The detailed description of the drawings particularly refers to the accompanying figures in which.

DETAILED DESCRIPTION OF THE DRAWINGS

The embodiments of the invention described herein are not intended to be exhaustive or to limit the invention to precise forms disclosed. Rather, the embodiments selected for description have been chosen to enable one skilled in the art to practice the invention.

Figure 1:
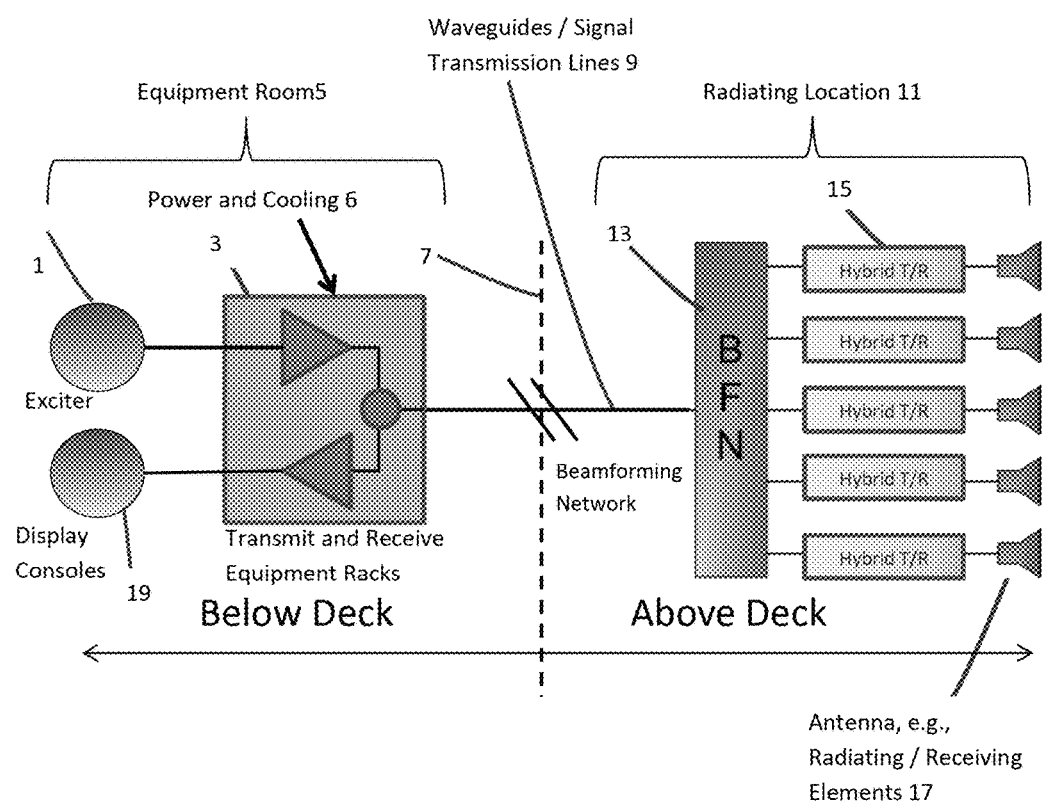
FIG. 1 shows a basic representation of a block diagram hybrid active array architecture.

Referring initially to FIG. 1, an exemplary block diagram of a hybrid active array is shown that can use an approach that allows transmitter components in a transmit and receive equipment section 3 to pump a transmit signal up to a radiating location 11 through a waveguide path 9. This figure depicts an exemplary design comprising an exciter 1, coupled to a transmit and receive section, illustratively racks 3. A waveguide/signal transmission line(s) section 9 couples a BFN 13 with the transmit and receive equipment rack section 3. The exciter 1 and transmit and receiver equipment racks 3 are in an equipment room 5 that houses cooling and high power systems 6 thus avoiding a need to route such cooling and high power supply systems up a tower or mast 7 to the radiating location 11. In this example, the equipment room 5 is located below decks of a ship (not shown) and the radiating location 11 is on a tower or mast 7.

The BFN 13 can be coupled to a plurality of hybrid transmit/receive modules (HTRMs) 15 that are coupled to antenna radiating and receiving elements (ARREs) 17. In this example, the BFN 13 can be configured to set an amplitude distribution of an antenna aperture for both the transmit and receive sidelobes. Low sidelobes on transmit can aid in reducing undesirable emissions in directions outside of a main beam which assists in, e.g., reducing interference which could be useful in, for example, self-driving vehicles receiving sidelobes that can interfere with the vehicle sensors.

In receive mode, a reverse operation can be provided for such a receiving signal into the ARREs 17 which are passed into the HTRM 15, through the BFN 13 into the waveguides or signal transmission lines 9 (which can be a separate set for a receive mode) that pass through an intervening region 7 between the radiating location 11 and equipment room 5, and into transmit and receiver equipment racks 3, which are then signal processed for output to various systems e.g., radar display 19, control systems (e.g., self driving car, automated equipment control systems using radar signal inputs, etc). Common components of an exemplary HTRM 15 can be configured to be capable of operating with moderate power levels e.g., less than 100 Watts.

Figure 2:
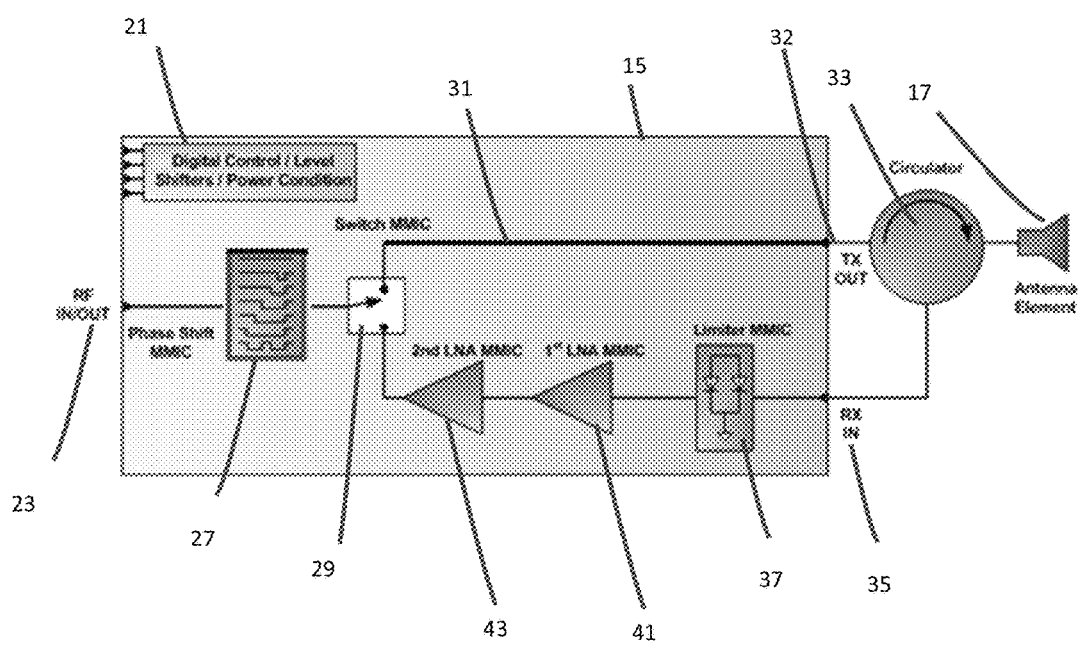
FIG. 2 shows a basic representation of a hybrid transmit/receive module (HTRM) architecture for the exemplary hybrid active array.

Referring to FIG. 2, an exemplary HTRM 15 architecture for an exemplary hybrid active array is shown depicting aspects and elements of operation inside of a single hybrid active array element. An exemplary HTRM 15 receives a radio frequency (RF) transmit signal at a RF input/output (IO) 23 from an output of the BFN 13 (see FIG. 1) which is coupled to a phase shift Monolithic Microwave Integrated Circuit (MMIC) 27. The RF input/output (IO) 23 can be viewed as a transmit/receive input/output (TRIO) bus for a variety of different signals, including RF signals.

The phase shift MMIC 27 introduces a phase delay or phase shift of the input signal. The phase shift MMIC 27 provides a phase shift necessary to generate a collective output from all of the HTRMs 15 and ARREs 17 necessary to steer the hybrid active array's main beam in a desired direction and with desired main beam output characteristics. Generally, the exemplary HTRM 15 can take an input transmit signal through the phase shift MMIC 27 and a switch MMIC 29 into a transmitting channel 31 which in turn passes the transmit signal into a circulator 33 via a transmit (TX) output port 32. The circulator 33 selectively passes the transmit signal to an individual radiating element (e.g., ARRE 17 or antenna element) for transmission.

The radiated transmit signal radiates from the ARRE 17 that combines in space with the other transmit signals from other ARREs 17 to form a beam that propagates through space, reflects off objects or targets, propagates back to the ARREs 17, and is respectively received by the ARREs 17 as a received signal.

In receive mode, the switch MMIC 29 switches to a receive position. The received signals are respectively sent from the ARREs 17 into the circulator 33 and then to an RX input port 35 of the HTRM 15. The RX input port 35 is coupled with a signal limiter MMIC 37 which receives the received signal. In this embodiment, the signal limiter MMIC 37 clips the received signal which limits a maximum power going through the limiter MMIC 37 so that the received signal does not exceed a predetermined power level, thus protecting sensitive receiver components. The limiter MMIC 37 is then coupled to a low noise amplifier (LNA) MMIC (e.g., in this case a two stage LNA scheme is used, e.g., there are two LNA MMICs 41, 43 connected in series, but other LNA systems or apparatuses can be also be used). The LNA amplifiers 41, 43 are coupled to the switch MMIC 29, now in receive mode, which then feeds the received signal as a low noise amplified received signal back to the phase shift MMIC 27, whereby the low noise amplified received signal is phase shifted again in combination with all other HTRMs 15 that are receiving individual low noise amplified received signals to steer a hybrid active array received beam direction in a desired receive beam direction. The HTRMs 15 collectively output a signal through the RF IO 23 back to the transmit and receive rack 3 (see FIG. 1) through the BFN 13 and waveguides/signal transmission lines 9. The HTRM 15 includes a digital controller/level shifter and power conditioner 21 that provided control signals and power for the HTRM 15 MMICs. Note that FIG. 2 describes a HTRM that uses discrete MMICs. Alternate embodiments can include a design where one or more elements of a given layout can be integrated on, e.g., a design including a single MMIC.

An exemplary method relative to an embodiment, such as shown in FIG. 1, can include a case where an exemplary exciter 1 generates a low power (milliwatts to watts) modulated radar or communication waveform and sends the lower power signal to the transmitter components in the transmit and receive equipment racks 3 where an amplifier (not shown) amplifies the low power signal to a high power (kilowatts to megawatts) waveform for transmission. A power source (many KVAs) can be used to power the amplification stages. Cooling (e.g., liquid cooling) can be required to remove heat generated from this process (typical efficiencies for solid-state devices is less than 50%, so over half the input power is converted to heat). The amplified signal is routed up tower or mast 7 through wave guides or transmission lines 9 to the BFN 13, then to the HTRMS 15, then to an antenna, e.g., ARREs 17, at the radiating location 11. The amplified signal can be routed to the BFN 13 which splits the amplified signal out into multiple signal channels (e.g., thousands for radar, and tens to hundreds for communication systems) and provides amplitude weightings of each channel for the desired sidelobe control. Each channel of the BFN 13 couples to a HTRM 15 which shifts the signal phase for beam steering and then feeds the ARREs 17 which, in turn, respectively radiate a moderate power level signal (tens to hundreds of watts) so as to combine individual outputs and thereby form a beam in space.

In receive mode, the ARREs 17 are excited by an incoming low power level signal (nano to pico watts) and produce a received signal which is routed to the HTRMs 15 where it is amplified, phase shifted, and sent to the BFN 13. It is possible to have several BFNs for the received signal, producing several receive channels. The received signal channel(s) output the received signal that is thereby sent from the radiation location 11 down the tower or mast 7 through waveguides or transmission lines 9 to the transmit and receive equipment racks 3 where it is processed for the desired output (audio, video or information) and sent to the output device (display 19).

An exemplary method relative to an embodiment such as, e.g., shown in FIG. 2, can include a method comprising providing, e.g., the HTRM 15 that contains a digital control, level shifter and power condition section 21. Exemplary HTRMs 15 can include an RF section, a power converter section and a digital section all on a single board. Power is required for the power converter section to generate exemplary supply voltages to the MMICs. The HTRM 15 can use significantly less power (50X to 100X) than existing or conventional transmit/receive (T/R) modules, thus reducing power requirements supplied to the antenna assembly at the radiating location 11 (e.g., FIG. 1). The reduced power requirement also is accompanied by an elimination of a need for liquid cooling at the radiating location 11 (e.g., FIG. 1). A data signal can be required for digital control of the phase shift MMIC 27 and switch MMICs 29. The circulator 33 can provide an isolation between transmit and receive channels coupled to the circulator 33 and typically can be mounted on the HTRM 15 boards.

With respect to an exemplary system including HTRM's 15 RF operation, the phase shift MMIC 27 can be common to both transmit and receive channels and sets a desired or proper phase for a beam steering function of the antenna. The switch MMIC 29 can select either transmit or receive channel for operation. In the transmit mode, the transmit signal is routed to the circulator 33 through a transmission line 31 through the Tx Out port 32. The circulator 33 directs the transmit signal out to the ARRE 17 to radiate the transmit signal into space along with all other collectively radiated transmit signals from all ARREs 17. In the receive mode, the circulator 33 directs the received signal from the ARRE 17 to the limiter MMIC 37 through the Rx In port 35. One function of the limiter MMIC 37 can include clipping any unintended power levels (from circulator leakage of the transmit signal or signals from near-by systems) above a threshold level in order to protect the sensitive LNA MMICs 41 and 43. The received signal can be sent through the limiter MMIC 37 to the LNA MMICs 41 and 43 (shown in FIG. 2 as a 2-stage amplifier), where the received signal is amplified and sent back through the switch MMIC 29, the phase shift MMIC 27 and out of the module through the RF In/Out port 23.

Although the invention has been described in detail with reference to certain preferred embodiments, variations and modifications exist within the spirit and scope of the invention as described and defined in the following claims.

The invention claimed is:

1. A system including a hybrid active array comprising of:
at least one exciter configured to generate a waveform, at least one transmitter configured to receive said waveform from said exciter and generate a transmit signal based on said waveform, an amplifier configured to amplify said transmit signal, a power supply configured to supply a first power level supply to said amplifier to amplify said transmit signal to a power level of one or more kilowatts to megawatts to generate an amplified transmit signal, and a cooling section configured to supply cooling to at least said amplifier, wherein said at least one transmitter is configured to generate said transmit signal in a first location;
at least one waveguide section adapted to respectively receive said amplified transmit signal;
a beamforming network section coupled to said at least one waveguides configured to respectively receive said amplified transmit signal and pass said amplified transmit signal into multiple signal channels;
an array of hybrid transmit/receive modules (HTRM) each comprising a transmit/receive input/output (TRIO) bus, a transmit output section, and a receive input section, each HTRM's said TRIO bus is respectively coupled to each of said multiple signal channels in said beamforming network section to respectively receive said amplified transmit signal, each said HTRM further comprises of a phase shifter coupled to said TRIO bus, a first switch selectively coupling said phase shifter and said transmit output section, first and second low noise amplifier (LNA) monolithic microwave integrated circuits (MMICs), and a limiter MMIC, wherein said first LNA MMIC, said second LNA MMIC and said Limiter MMIC are connected in series, wherein second LNA MMIC is connected to said first switch, wherein said limiter MMIC is coupled to said receive input section, each said HTRM further comprises of digital controls, level shifters, and power conditions;
a plurality of signal circulators or second switch sections each respectively coupled to said HTRMs in said array of HTRMs, each said signal circulators or second switch sections are configured to selectively switch connections to either said transmit output section or said receive input section of each said HTRMs;
a plurality of antenna sections, each antenna section is respectively coupled with one said signal circulator or second switch, wherein said plurality of antenna sections are collectively configured to have an antenna aperture configuration, wherein each said plurality of antenna sections are configured to respectively receive a separate said amplified transmit signal passed through said HTRMs and said signal circulator or second switch section, each of said antenna sections are configured to pass a received signal to said circulator or second switch from one of said plurality of antenna sections, wherein each said circulator or second switch is further configured to selectively pass respective said received signals to said receive input section in a receive mode; and
one or more controller sections adapted to control said system comprising said hybrid active array, wherein at least one of said one or more controller sections is configured to control said beamforming network section to set an amplitude distribution of the antenna aperture to reduce transmit and receive sidelobes of at least some of said plurality of antenna sections;
wherein said one or more controller sections are configured to control each said phase shifter to apply a steering or control phase shift necessary to generate a collective beam output from all of the HTRMs and antenna sections to steer the collective main beam generated by the hybrid active array in a desired direction and with desired main beam output characteristics;
wherein said beamforming network section, said hybrid transmit/receive modules, and said antenna sections are positioned on a tower or structure spaced apart from said first location.

2. The system as in claim 1, wherein the phase shifter comprises a Phase Shift MMIC.

3. The system as in claim 1, wherein the switch comprises a switch MMIC.

4. The system as in claim 1, wherein a first section of said system is positioned on a ship below an exterior deck of the ship and a second section of the system is positioned on a mast or a structure positioned above the exterior deck.

5. The system as in claim 4, wherein the first section comprises said transmitter, said power supply, and said cooling section and the second section comprises said beamforming section, said HTRMs, and said antenna sections.

6. A method of operating a system including a hybrid active array comprising of:
providing at said system including a hybrid active array comprising:
at least one exciter configured to generate a waveform, at least one transmitter configured to receive said waveform from said exciter and generate a transmit signal based on said waveform, an amplifier configured to amplify said transmit signal, a power supply configured to supply a first power level supply to said amplifier to amplify said transmit signal to a higher power level of one or more kilowatts to megawatts to generate an amplified transmit signal, and a cooling section configured to supply cooling to at least said amplifier, wherein said at least one transmitter is configured to generate said transmit signal in a first location;
at least one waveguide section adapted to respectively receive said amplified transmit signal;
a beamforming network section coupled to said at least one waveguides configured to respectively receive said amplified transmit signal into multiple signal channels;
an array of hybrid transmit/receive modules (HTRM) each comprising a transmit/receive input/output (TRIO) bus, a transmit output section, and a receive input section, each HTRM's said TRIO bus is respectively coupled to one of said multiple signal channels in said beamforming network section to receive said amplified transmit signal, each said HTRM further comprises of a phase shifter coupled to said TRIO bus, a first switch selectively coupling said phase shifter and said transmit output section, first and second low noise amplifier (LNA) monolithic microwave integrated circuits MMICs, and a limiter MMIC, wherein said first LNA MMIC, said second LNA MMIC and said Limiter MMIC are connected in series, wherein second LNA MMIC is connected to said first switch, wherein said limiter MMIC is coupled to said receive input section, each said HTRM further comprises of digital controls, level shifters, and power conditions;

a plurality of signal circulators or second switch sections each respectively coupled to said HTRMs in said array of HTRMs, each said signal circulators or second switch sections are configured to selectively switch connections to either said transmit output section or said receive input section of each said HTRMs;

a plurality of antenna sections, each antenna section is respectively coupled with one said signal circulator or second switch, wherein said plurality of antenna sections are collectively configured to have an antenna aperture configuration, wherein each said plurality of antenna sections are configured to respectively receive a separate said amplified transmit signal passed through said HTRMs and said signal circulator or second switch section, each of said antenna sections are configured to pass a received signal to said circulator or second switch from one of said plurality of antenna sections, wherein each said circulator or second switch is further configured to selectively pass respective said received signals to said receive input section in a receive mode; and one or more controller sections adapted to control said system comprising said hybrid active array, wherein at least one of said one or more controller sections is configured to control said beamforming network section to set an amplitude distribution of the antenna aperture to reduce transmit and receive sidelobes of at least some of said plurality of antenna sections;

wherein said one or more controller sections are configured to control each said phase shifter to apply a steering or control phase shift necessary to generate a collective beam output from all of the HTRMs and antenna sections to steer the collective main beam generated by the hybrid active array in a desired direction and with desired main beam output characteristics;

wherein said beamforming network section, said hybrid transmit/receive modules, and said antenna sections are positioned at a second location comprising a tower or structure spaced apart from said first location;

generating said waveform for a plurality of said transmit signals using said exciter, wherein said exciter generates a low power said waveform, milliwatts to watts, modulated radar or communication waveform and sends the waveform to said transmitter which then outputs said transmit signal to said amplifier where the transmit signal is amplified to said higher power to generate said amplified transmit signal;

applying cooling from said cooling section to said amplifier at said first location;

passing said amplified transmit signal to said waveguide section which in conveys said amplified transmit signal to said beamforming network section and then into said multiple signal channels located at said second location; and routing said amplified transmit signal and provides amplitude weightings of each amplified transmit signal in each channel for a desired sidelobe control, wherein each said channel of the beamforming network respectively couples each said amplified transmit signal with said TRIO bus which passes each said amplified transmit signal to each said phase shifter which shifts a signal phase of each said amplified transmit signal to generate said collective beam output from all of the HTRMs and antenna sections through said signal circulator or second switch.

7. A method as in claim 6, further comprising selectively operating said system in a receive mode comprising excited one or more said antenna elements by an incoming low power level signal, nano to pico watts, and producing a received signal from said one or more antenna elements, one or more said received signals are respectively are routed from said one or more said antenna elements to one or more said circulators or second switch in a receive mode, wherein said one or more circulators or second switches in turn respectively routes each said received signal a respective said HTRMs where said received signal is amplified, phase shifted, and sent to one or more said multiple signal channels in said beam forming network, the one or more received signals are then routed to a receiver section in said first location through said at least one waveguide section where said received signal is processed and passed to an output or signal processing system comprising one of an audio, video, radar, or information system, said output or signal processing system outputting said processed received signal for output by an output device.

8. The method as in claim 6, wherein the phase shifter comprises a Phase Shift MMIC.

9. The method as in claim 6, wherein the switch comprises a switch MMIC.

10. The method as in claim 6, wherein a first section of said system is positioned on a ship below an exterior deck of the ship and a second section of the system is positioned on a mast or a structure positioned above the exterior deck.

11. The method as in claim 6, wherein said output device is a radar display.

* * * * *